US007826494B2

(12) United States Patent
Thangaraj

(10) Patent No.: US 7,826,494 B2
(45) Date of Patent: Nov. 2, 2010

(54) SYSTEM AND METHOD FOR HANDLING AUDIO JITTERS

(75) Inventor: Arul Thangaraj, Karnataka (IN)

(73) Assignee: Broadcom Corporation, Irvine, CA (US)

( * ) Notice: Subject to any disclaimer, the term of this patent is extended or adjusted under 35 U.S.C. 154(b) by 966 days.

(21) Appl. No.: 11/131,484

(22) Filed: May 18, 2005

(65) Prior Publication Data

US 2006/0245311 A1 Nov. 2, 2006

Related U.S. Application Data

(60) Provisional application No. 60/676,441, filed on Apr. 29, 2005.

(51) Int. Cl.
*H04J 3/06* (2006.01)

(52) U.S. Cl. ....................... 370/516; 704/205; 704/501; 725/102; 370/503

(58) Field of Classification Search ................. 370/516, 370/235, 252, 253, 517, 519, 508; 704/201
See application file for complete search history.

(56) References Cited

U.S. PATENT DOCUMENTS 6,678,332 B1 * 1/2004 Gardere et al. ......... 375/240.26
6,792,047 B1 * 9/2004 Bixby et al. ........... 375/240.26
6,862,298 B1 * 3/2005 Smith et al. ................. 370/516
7,418,396 B2 * 8/2008 Koshy ........................ 704/501
7,464,028 B2 * 12/2008 Singhal ...................... 704/205
7,657,336 B2 * 2/2010 Rao et al. ..................... 700/94
2005/0049853 A1 * 3/2005 Lee et al. .................... 704/201
2006/0247928 A1 * 11/2006 Cowdery .................... 704/229

* cited by examiner

*Primary Examiner*—Donald L Mills
*Assistant Examiner*—Henry Baron
(74) *Attorney, Agent, or Firm*—McAndrews Held & Malloy, Ltd.

(57) ABSTRACT

Presented herein are system(s) and method(s) for handling audio jitters. In one embodiment; there is presented a method for decoding an audio signal. The method comprises receiving a portion of the audio signal, the portions of the audio signal associated with a time stamp; comparing the time stamp associated with the portion of the audio signals to a reference time; generating another portion of the audio signal, if the time stamp is later than the time reference by over a certain margin or error; and dewindowing the another portion with a previously played portion of the audio signal, thereby resulting in a an another dewindowed portion.

20 Claims, 4 Drawing Sheets

SYSTEM AND METHOD FOR HANDLING AUDIO JITTERS

RELATED APPLICATIONS

The present application claims priority to U.S. Provisional Application Ser. No. 60/676,441, entitled "SYSTEM AND METHOD FOR HANDLING AUDIO JITTERS", filed Apr. 29, 2005, by Arul Thangaraj, which is incorporated herein by reference for all purposes.

MICROFICHE/COPYRIGHT REFERENCE

[Not Applicable]

BACKGROUND OF THE INVENTION

Common audio encoding standards, such as MPEG-1, Layer 3, significantly compress audio data. This allows for the transmission and storage of the audio and video data with less bandwidth and memory.

Common audio and video encoding standards, such as MPEG-1, Layer 3 (audio) and MPEG-2, or H.264 (video), significantly compress audio and video data, respectively.

In general, the video encoding standards operate on the pictures forming the video. A video comprises a series of pictures that are captured at time intervals. When the pictures are displayed at corresponding time intervals in the order of capture, the pictures simulate motion.

Generally, audio signals are captured in frames representing particular times. During playback, the frames are played at corresponding time intervals in the order of capture. In multi-media applications, it is desirable to play the audio and video, such that audio frames and pictures that were captured during the same time interval are played at approximately the same time interval.

Encoding standards use time stamps to facilitate playback of audio at appropriate times. A decoder compares the times stamps to a system clock to determine the appropriate portions of the audio and video to play. The time stamps are generally examined prior to decoding, because decoding consumes considerable processing power.

Ideally, the time stamps of incoming frames of audio data lead and have a similar rate of increase with the time reference. In such as case, a decoder can decode, and a buffer can buffer several audio frames in advance of playback.

Where the time stamps associated with the incoming frames rise faster than the time reference, the buffers can overflow, resulting in dropped audio frames. When the time arrives for playing the dropped audio frames, there are no audio frames to play. The dropping of audio frames will result in clicking or popping sounds. The clicking and popping sounds significantly degrade the audio quality.

Where the time stamps associated with the incoming frames rise slower than the time reference, the buffers can underflow. As a result, the audio frames are not available at the time of play.

The foregoing are commonly alleviate by either repeating frames or inserting blank frames. This can result in clicking or popping sounds. The clicking and popping sounds significantly degrade the audio quality.

Further limitations and disadvantages of conventional and traditional systems will become apparent to one of skill in the art through comparison of such systems with the invention as set forth in the remainder of the present application with reference to the drawings.

SUMMARY OF THE INVENTION

Presented herein are system(s) and method(s) for handling audio jitters.

In one embodiment, there is presented a method for decoding an audio signal. The method comprises receiving a portion of the audio signal, the portions of the audio signal associated with a time stamp; comparing the time stamp associated with the portion of the audio signals to a reference time; generating another portion of the audio signal, if the time stamp is later than the time reference by over a certain margin or error; and dewindowing the another portion with a previously played portion of the audio signal, thereby resulting in a an another dewindowed portion.

In another embodiment, generating the another portion further comprises filling the another portion of the audio signal with zero values.

In another embodiment, the method further comprises playing a frame of samples generated from the another dewindowed portion.

In another embodiment, the method further comprises: a) selecting a next portion if the time stamp associated with the portion is earlier than the time reference by more than the certain margin of error; b) comparing a time stamp associated with the time reference; and c) dewindowing the next portion with the previous portion of the audio signal if the time stamp associated with the next portion is within a margin of error from the time reference, thereby resulting in a next dewindowed portion.

In another embodiment, the method further comprises repeating a)-c) until the time stamp associated with the next portion is within a margin of error from the time reference.

In another embodiment, the method further comprises playing a frame generated from the next dewindowed portion.

In another embodiment, there is presented a system for decoding an audio signal. The system comprises a receiver, a controller, and a decoder. The receiver receives a portion of the audio signal. The portions of the audio signal are associated with a time stamp. The controller compares the time stamp associated with the portion of the audio signals to a reference time. The controller generates another portion of the audio signal, if the time stamp is later than the time reference by over a certain margin or error. The decoder dewindows the another portion with a previously played portion of the audio signal, thereby resulting in an another dewindowed portion.

In another embodiment, generating the another portion further comprises: filling the another portion of the audio signal with zero values.

In another embodiment, the system further comprises a speaker for playing the another dewindowed portion.

In another embodiment, the controller a) selects a next portion if the time stamp associated with the portion is earlier than the time reference by more than the certain margin of error; and b) compares a time stamp associated with the time reference. The decoder c) dewindows the next portion with the previously played portion of the audio signal if the time stamp associated with the next portion is within a margin of error from the time reference, thereby resulting in a next dewindowed portion.

In another embodiment, the controller and decoder repeat a)-c) until the time stamp associated with the next portion is within a margin of error from the time reference.

In another embodiment, the system further comprises a system clock for providing the time reference.

In another embodiment, there is presented a circuit comprising one or more processors and a memory connected to the processor. The memory stores a plurality of executable instructions. Execution of the instructions by the one or more processors causes receiving a portion of the audio signal, the portions of the audio signal associated with a time stamp; comparing the time stamp associated with the portion of the audio signals to a reference time; generating another portion of the audio signal, if the time stamp is later than the time reference by over a certain margin or error; and dewindowing the another portion with a previous portion of the audio signal, thereby resulting in an another dewindowed portion.

In another embodiment, generating the another portion further comprises filling the another portion of the audio signal with zero values.

In another embodiment, execution of the plurality of instructions by the one or more processors causes playing a frame of samples generated from the another dewindowed portion.

In another embodiment, execution of the plurality of instructions also causes: a) selecting a next portion if the time stamp associated with the portion is earlier than the time reference by more than the certain margin of error; b) comparing a time stamp associated with the time reference; and c) dewindowing the next portion with the previous portion of the audio signal if the time stamp associated with the next portion is within a margin of error from the time reference, thereby resulting in a next dewindowed portion.

In another embodiment, execution of the plurality of instructions also causes repeating a)-c) until the time stamp associated with the next portion is within a margin of error from the time reference.

In another embodiment, execution of the plurality of instructions also causes playing a frame generated from the next dewindowed portion.

These and other advantages and novel features of the present invention, as well as details of illustrated examples embodiments thereof, will be more fully understood from the following description and drawings.

DETAILED DESCRIPTION OF THE INVENTION

Figure 1:
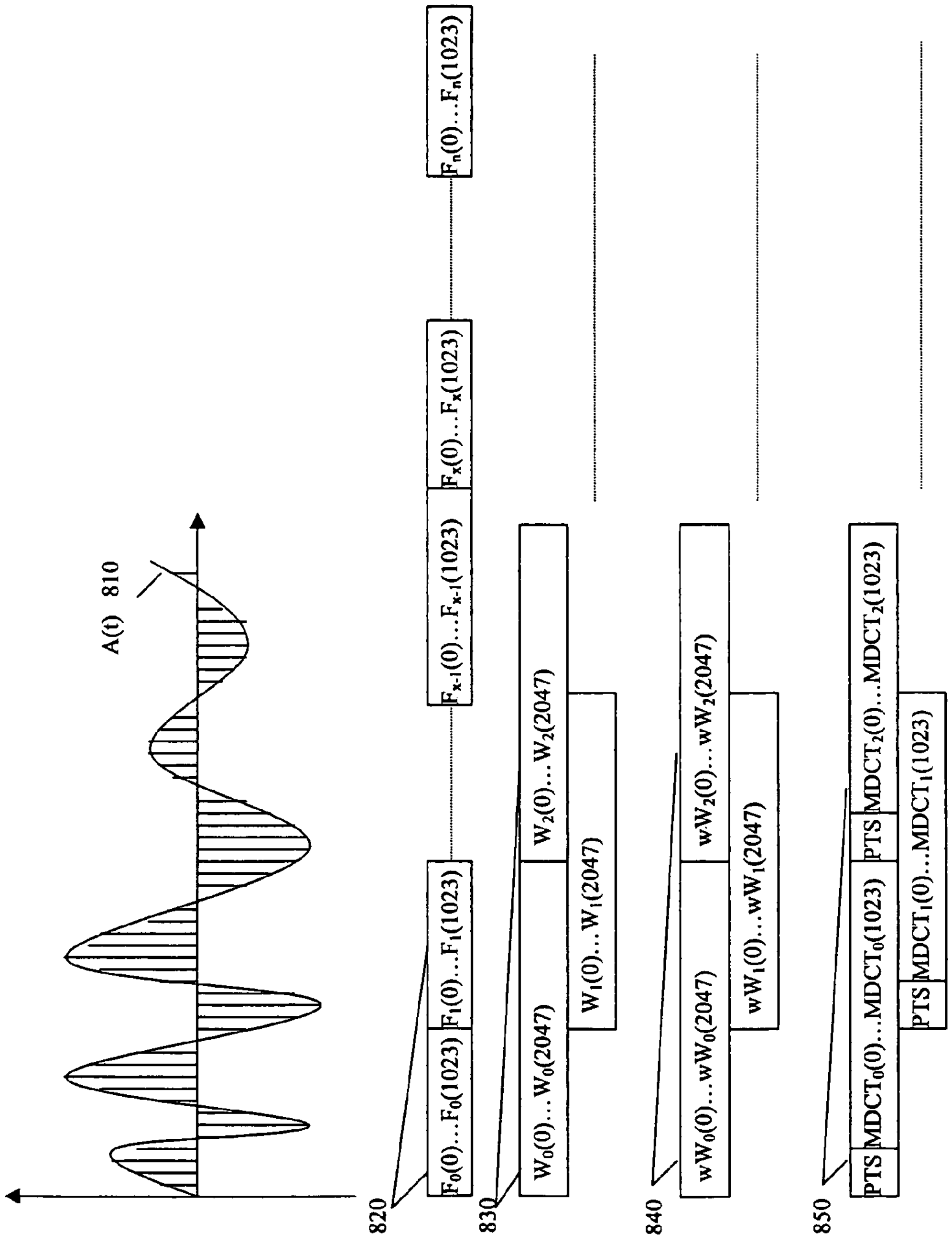
FIG. 1 is a block diagram illustrating encoding of an exemplary audio signal.

Referring now to FIG. 1, there is illustrated a block diagram illustrating encoding of an exemplary audio signal A(t) 810 according to the MPEG-2, AAC standard. The audio signal 810 is sampled and the samples are grouped into frames 820 ($F_0 \ldots F_n$) of 1024 samples, e.g., ($F_x(0) \ldots F_x(1023)$). The frames 820 ($F_0 \ldots F_n$) are grouped into windows 830 ($W_0 \ldots W_n$) that comprise 2048 samples or two frames, e.g., ($W_x(0) \ldots W_x(2047)$). However, each window 830C $W_x$ has a 50% overlap with the previous window 830C $W_{x-1}$.

Accordingly, the first 1024 samples of a window 830C $W_x$ are the same as the last 1024 samples of the previous window 830 $W_{x-1}$. A window function w(t) is applied to each window 830 ($W_0 \ldots W_n$), resulting in sets ($wW_0 \ldots wW_n$) of 2048 windowed samples 840, e.g., ($wW_x(0) \ldots wW_x(2047)$). The modified discrete cosine transformation (MDCT) is applied to each set ($wW_0 \ldots wW_n$) of windowed samples 840 ($wW_x(0) \ldots wW_x(2047)$), resulting in a frame comprising sets ($MDCT_0 \ldots MDCT_n$) of 1024 frequency coefficients 850(0) . . . 850(*n*), e.g., ($MDCT_x(0) \ldots MDCT_x(1023)$).

The frames 850(0) . . . 850(*n*) of frequency coefficients ($MDCT_0 \ldots MDCT_n$) are then quantized and coded for transmission. The frames 850(0) . . . 850(*n*) also include additional parameters, including a presentation time stamp PTS. The frames 850(0) . . . 850(*n*) form what is known as an audio elementary stream (AES). The AES can be multiplexed with other AESs and video elementary streams. The multiplexed signal, known as the Audio Transport Stream (Audio TS) can then be stored and/or transported for playback on a playback device. The playback device can either be local or remotely located.

Where the playback device is remotely located, the multiplexed signal is transported over a communication medium, such as the internet. During playback, the Audio TS is demultiplexed, resulting in the constituent AES signals. The constituent AES signals are then decoded, resulting in the audio signal.

Figure 2:
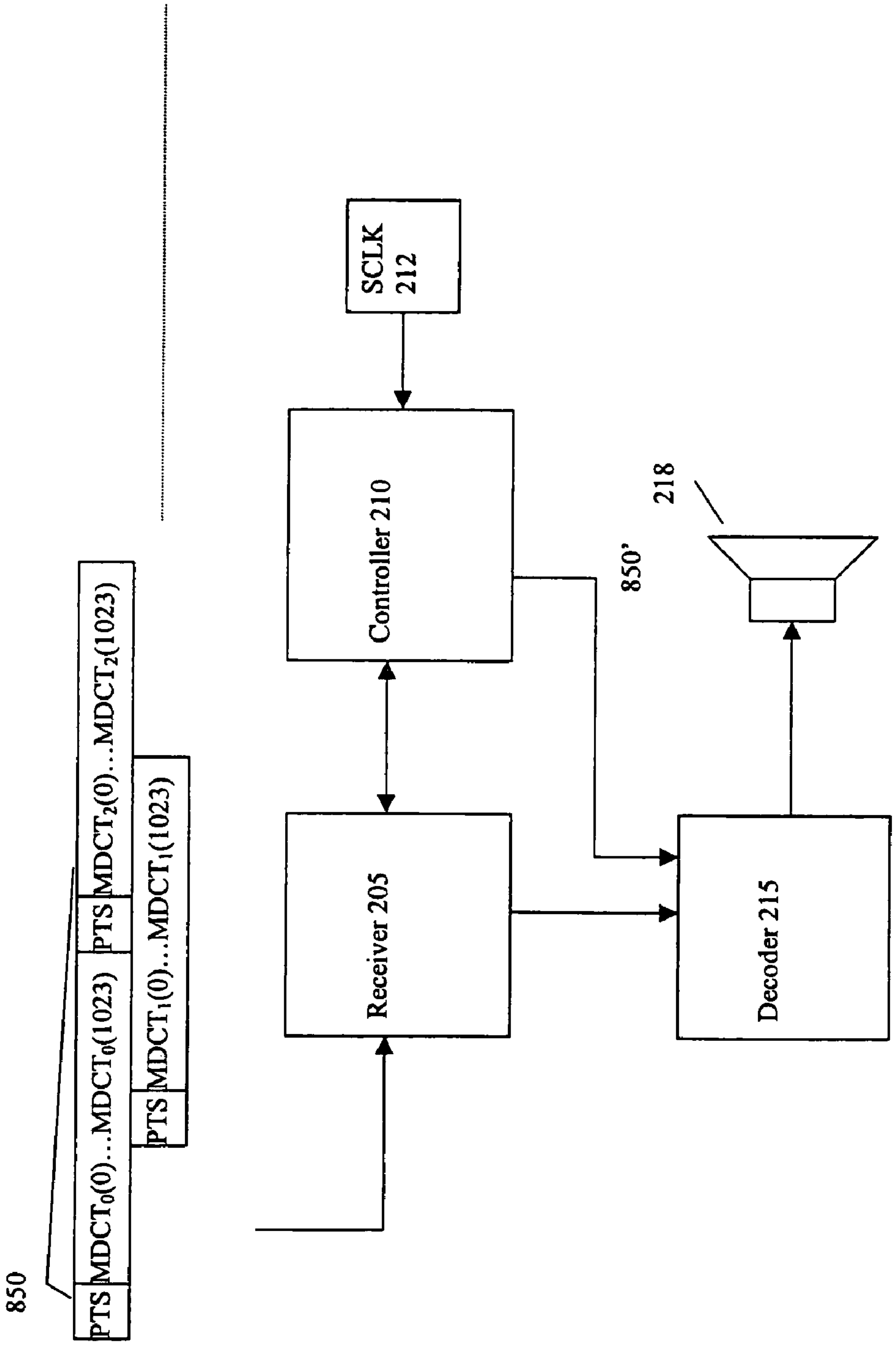
FIG. 2 is a block diagram of an exemplary decoder system in accordance with an embodiment of the present invention.

Referring now to FIG. 2, there is illustrated a block diagram describing an exemplary decoder system. The decoder system comprises a receiver 205, a controller 210, and decoder 215. The receiver 205 receives portions of an audio signal. The portions can comprise, for example frames 850(0) . . . 850(*n*). As noted above, the frames 850(0) . . . 850(*n*) are associated with presentation time stamps.

The controller 210 compares the time stamps associated with the incoming portions of the audio signals to a reference time. A system clock 212 can provide the time reference. If the time stamp is later than the time reference by over a certain margin or error and generating another portion 850' of the audio signal. According to certain aspects of the invention, the controller 210 can fill the generated frame with all zero values. The decoder 215 dewindows the generated portion with a previous portion of the audio signal. A speaker 218 can play a portion of the audio signal generated from the dewindowed generated portion and previous portion.

According to certain aspects of the present invention, if the time stamp associated with the portion is earlier than the time reference by more than the certain margin of error, the controller selects the next portion of the audio signal and compares a time stamp associated with the time reference. The decoder 215 dewindows the next portion with the previous portion of the audio signal if the time stamp associated with the next portion is within a margin of error from the time reference, thereby resulting in a next dewindowed portion. This can be repeated until the next portion is associated with a time stamp that is within the margin of error from the time reference. The speaker 218 can play a portion of the audio signal generated from the next dewindowed portion.

Figure 3:
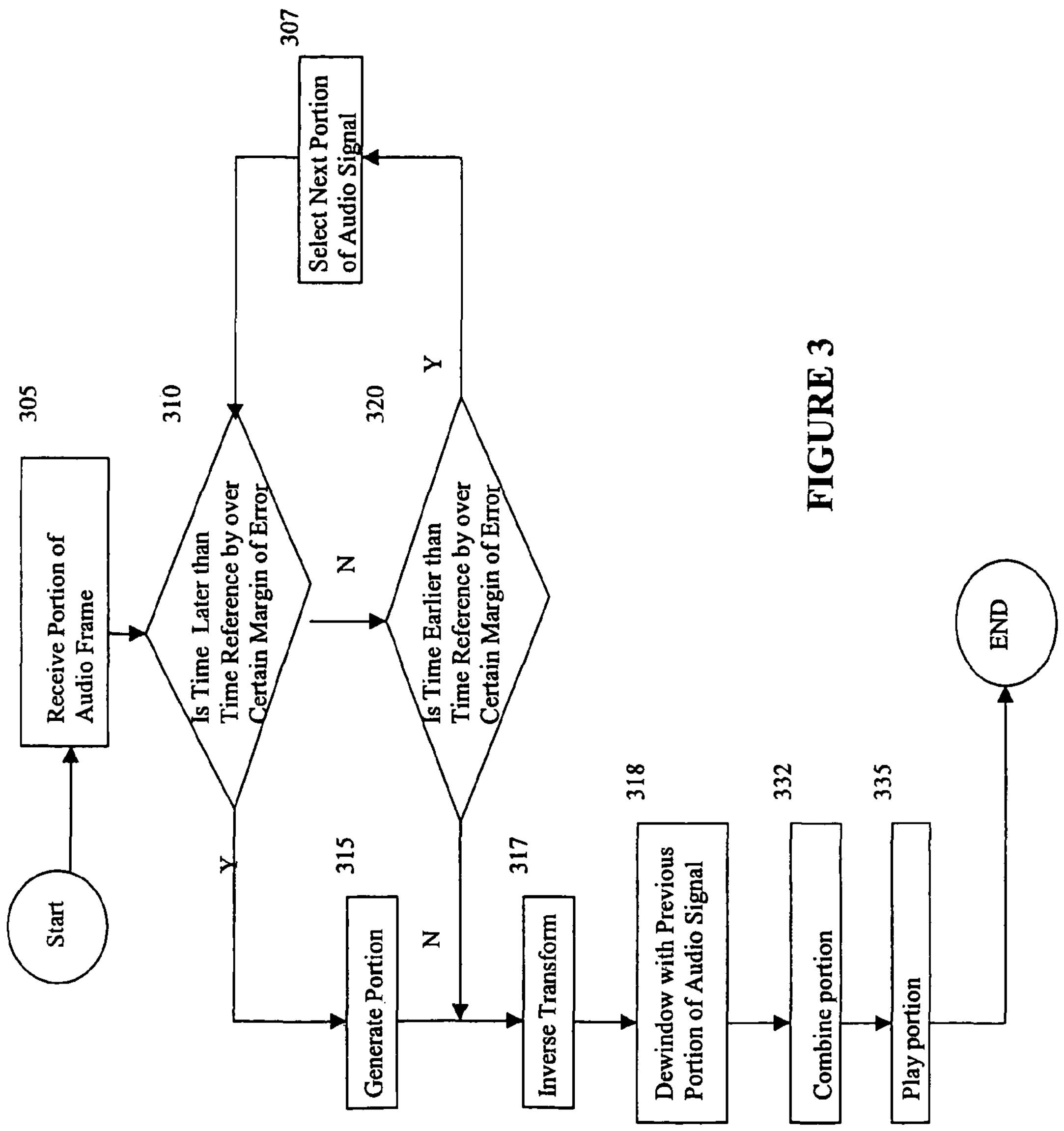
FIG. 3 is a flow diagram for decoding an audio signal in accordance with an embodiment of the present invention.
Figure 4:
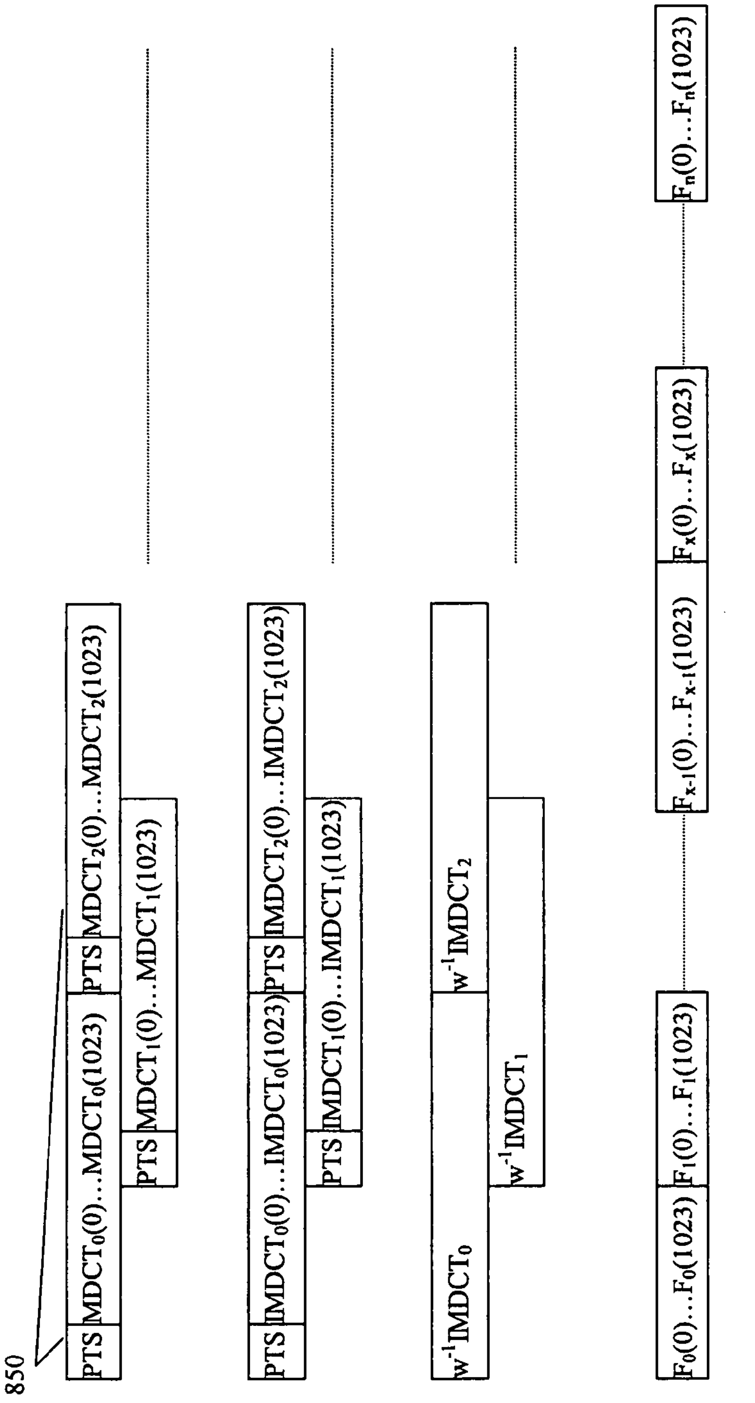
FIG. 4 is a block diagram describing the decoding of an audio signal in accordance with an embodiment of the present invention.

Referring now to FIG. 3, there is illustrated a flow diagram for decoding an audio signal. The flow diagram will be described with reference to FIG. 4. FIG. 4 illustrates decoding the audio signal in accordance with an embodiment of the present invention.

At 305 a portion of the audio signal, e.g., frame 850C(x) of MDCT coefficients $MDCT_x(0) \ldots MDCT_x(1023)$, associated with a time stamp TS is received. At 310, a comparison is made with the time stamp associated with the portion of the audio signal received during 305. If the time stamp is later than the time reference by over a certain margin of error, another portion of the audio signal, e.g., frame 850C(x)' is generated at 315. The generated portion of the audio signal is inverse transformed (317) and dewindowed (318) with a previously played portion of the audio signal, e.g., $IMDCT_{x-1}$, resulting in dewindowed portion, $w^{-1}IMDCT_x$.

If at 310, the time stamp TS is not later than the time reference by over a certain margin of error, a determination is made at 320, whether the time stamp TS is earlier than the time reference by over the margin of error. If the time stamp TS is earlier than the time reference by over the margin of error, at 325, a next portion, $MDCT_{x+1}$, is selected at 307 and 310 is repeated. If at 320, the time stamp TS is not earlier than the time reference by over the margin of error, the portion of the audio signal is dewindowed (330) with a played portion. The dewindowed portion of the audio signal, either during 317 or 330, $w^{-1}IMDCT_x$, can be combined (332) with $w^{-1}IMDCT_{x-1}$, resulting in a frame of samples, $F_x(0) \ldots F_x(1023)$. The frame of samples, $F_x(0) \ldots F_x(1023)$ can be played at 335.

One embodiment of the present invention may be implemented as a board level product, as a single chip, application specific integrated circuit (ASIC), or with varying levels integrated on a single chip with other portions of the system as separate components. The degree of integration of the monitoring system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device with various functions implemented as firmware. In one representative embodiment, the encoder system is implemented as single integrated circuit (i.e., a single chip design).

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for decoding an audio signal, the method comprising:

receiving a frame of the encoded audio signal, wherein the encoded audio signal comprises frames that are windowed with overlapping signal portions by a windowing function, the frames of the encoded audio signal associated with a presentation time stamp at a decoder;

comparing the time stamp associated with the frame of the encoded audio signals to a local clock reference time at the decoder;

generating another frame of the encoded audio signal, if the presentation time stamp is later than the time reference by over a certain margin of error at the decoder, wherein generating another frame comprises filling the another frame of the audio signal with zero value coefficients in the frequency domain; and inversing the windowing function on the another frame with a previous frame of the encoded audio signal, combining the inversed another frame with the inversed previous frame, thereby resulting in a dewindowed portion.

2. The method of claim 1, further comprising:

playing a frame of samples generated from the another dewindowed portion.

3. A decoder system for decoding an audio signal, the decoder system comprising:

a receiver for receiving a frame of the encoded audio signal, wherein the encoded audio signal comprises frames that are windowed with overlapping signal portions by a windowing function by an encoder, the frames of the encoded audio signal associated with a presentation time stamp at the decoder system;

a controller for comparing the time stamp associated with the frame of the encoded audio signals to a local clock reference time and generating another frame of the encoded audio signal, if the presentation time stamp is later than the time reference by over a certain margin of error at the decoder system, wherein generating another frame comprises filling the another frame of the audio signal with zero value coefficients in the frequency domain; and a decoder for inversing the windowing function on the another frame with a previous frame of the encoded audio signal, combining the inversed another frame with the inversed previous frame, thereby resulting in a dewindowed portion.

4. The system of claim 3, further comprising:

a speaker for playing the another dewindowed portion.

5. The system of claim 3, further comprising:

a system clock for providing the time reference.

6. A circuit for decoding an audio signal, the circuit comprising:

one or more processors;

memory connected to the processor, said memory storing a plurality of executable instructions, wherein execution of the instructions by the one or more processors causes:

receiving a frame of the encoded audio signal, wherein the encoded audio signal comprises frames that are windowed with overlapping signal portions by a windowing function, the frames of the encoded audio signal associated with a presentation time stamp at a decoder;

comparing the time stamp associated with the frame of the encoded audio signals to a local clock reference time at the decoder;

generating another frame of the encoded audio signal, if the presentation time stamp is later than the time reference by over a certain margin of error at the decoder, wherein generating another frame comprises filling the another frame of the audio signal with zero value coefficients in the frequency domain; and inversing the windowing function on the another frame with a previous frame of the encoded audio signal, combining the inversed another frame with the inversed previous frame, thereby resulting in a dewindowed portion.

7. The circuit of claim 6, wherein execution of the plurality of instructions by the one or more processors causes:

playing a frame of samples generated from the another dewindowed portion.

8. The method of claim 1, wherein inversing the windowing function on the another frame with the previous frame of the audio signal, if the presentation time stamp is within the local clock time reference by a certain margin of error further comprises inversing the windowing function on the another frame with only the previous frame of the audio signal, combining the inversed another frame with the inversed previous frame thereby resulting in a dewindowed portion.

9. The decoder system of claim 3, wherein inversing the windowing function on the another frame with the previous frame of the audio signal, if the presentation time stamp is within the local clock time reference by a certain margin of error further comprises inversing the windowing function on the another frame with only the previous frame of the audio signal, combining the inversed another frame with the inversed previous frame, thereby resulting in a dewindowed portion.

10. The circuit of claim 6, wherein inversing the windowing function on the another frame with the previous frame of the audio signal, if the presentation time stamp is within the local clock time reference by a certain margin of error further comprises inversing the windowing function on the another frame with only the previous frame of the audio signal, combining inverse another frame with inverse previous frame, thereby resulting in a dewindowed portion.

11. A method for decoding an audio signal, the method comprising:

receiving a frame of the encoded audio signal, wherein the encoded audio signal comprises frames that are windowed with overlapping signal portions by a windowing function, the frames of the encoded audio signal associated with a presentation time stamp at a decoder;

comparing the time stamp associated with the frame of the encoded audio signals to a local clock reference time at the decoder;

generating another frame of the encoded audio signal, if the presentation time stamp is earlier than the time reference by over a certain margin of error at the decoder, until a frame is selected that is within the certain margin of error from the time reference;

inversing the windowing function on the another frame with a previous frame of the encoded audio signal, combining the inversed another frame with the inversed previous frame, thereby resulting in a dewindowed portion.

12. The method of claim 11, further comprising:

playing a frame generated from the next dewindowed portion.

13. The method of claim 11, wherein inversing the windowing function on the next frame with the previous frame of the audio signal if the time stamp associated with the next frame is within a margin of error from the time reference, thereby resulting in a next dewindowed portion further comprises inversing the windowing function on the next frame with only the previous frame of the audio signal, combining the inversed next frame with the inversed previous frame, thereby resulting in the next dewindowed portion.

14. A decoder system for decoding an audio signal, the decoder system comprising:

a receiver for receiving a frame of the encoded audio signal, wherein the encoded audio signal comprises frames that are windowed with overlapping signal portions by a windowing function by an encoder, the frames of the encoded audio signal associated with a presentation time stamp at the decoder system;

a controller for comparing the time stamp associated with the frame of the encoded audio signals to a local clock reference time and generating another frame of the encoded audio signal, if the presentation time stamp is earlier than the time reference by over a certain margin of error at the decoder system, wherein generating another frame comprises selecting next frames if the presentation time stamp associated with the frame is earlier than the time reference by more than the certain margin of error, until a frame is selected that is within the certain margin of error from the time reference; and a decoder for inversing the windowing function on the another frame with a previous frame of the encoded audio signal, combining the inversed next frame with the inversed previous frame, thereby resulting in a dewindowed portion.

15. The decoder system of claim 14, further comprising:

a speaker for playing the another dewindowed portion.

16. The decoder system of claim 14, further comprising:

a system clock for providing the time reference.

17. The decoder system of claim 14, wherein inversing the windowing function on the next frame with the previous frame of the audio signal if the time stamp associated with the next frame is within a margin of error from the time reference, thereby resulting in a next dewindowed portion further comprises inversing the windowing function on the next frame with only the previous portion of the audio signal if the time stamp associated with the next frame is within a margin of error from the time reference, combining the inversed next frame with the inversed previous frame, thereby resulting in the next dewindowed portion.

18. A circuit for decoding an audio signal, the circuit comprising:

one or more processors;

memory connected to the processor, said memory storing a plurality of executable instructions, wherein execution of the instructions by the one or more processors causes:

receiving a frame of the encoded audio signal, wherein the encoded audio signal comprises frames that are windowed with overlapping signal portions by a windowing function, the frames of the encoded audio signal associated with a presentation time stamp at a decoder;

comparing the time stamp associated with the frame of the encoded audio signals to a local clock reference time at the decoder;

generating another frame of the encoded audio signal, if the presentation time stamp is earlier than the time reference by over a certain margin of error at the decoder, wherein generating another frame comprises selecting next frames if the presentation time stamp associated with the frame is earlier than the time reference by more than the certain margin of error, until a frame is selected that is within the certain margin of error from the time reference; and inversing the windowing function on the another frame with a previous frame of the encoded audio signal, combining the inversed another frame with the inversed previous frame, thereby resulting in a dewindowed portion.

19. The circuit of claim 18, wherein execution of the plurality of instructions by the one or more processors causes:

playing a frame of samples generated from the another dewindowed portion.

20. The system of claim 18, wherein inversing the windowing function on the next frame with the previous frame of the audio signal if the time stamp associated with the next frame is within a margin of error from the time reference, thereby resulting in a next dewindowed portion further comprises inversing the windowing function on the next frame with only the previous portion of the audio signal if the time stamp associated with the next frame is within a margin of error from the time reference, combining the inversed next frame with the inversed previous frame, thereby resulting in the next dewindowed portion.

* * * * *